(12) United States Patent
Baxter et al.

(10) Patent No.: US 6,500,254 B1
(45) Date of Patent: Dec. 31, 2002

(54) CEMENTS INCLUDING LITHIUM GLASS COMPOSITIONS

(75) Inventors: Stephen Baxter, Dallas, NC (US); David B. Stokes, Shelby, NC (US)

(73) Assignee: FMC Corporation, Philadelphia, PA (US)

( * ) Notice: Subject to any disclaimer, the term of this patent is extended or adjusted under 35 U.S.C. 154(b) by 0 days.

(21) Appl. No.: 09/610,101

(22) Filed: Jun. 30, 2000

(51) Int. Cl.$^7$ .............................. C04B 7/00; C04B 7/02; C04B 14/22

(52) U.S. Cl. ..................... 106/814; 106/711; 106/716; 106/721

(58) Field of Search ................................ 106/814, 711, 106/716, 721

(56) References Cited

U.S. PATENT DOCUMENTS

| | | | |
|---|---|---|---|
| 3,783,092 A | | 1/1974 | Majundar |
| 3,814,611 A | | 6/1974 | Dumbaugh, Jr. |
| 3,823,021 A | | 7/1974 | Jansen |
| 3,969,121 A | | 7/1976 | Atkinson |
| 3,973,974 A | | 8/1976 | Ohtomo et al. |
| 4,002,482 A | | 1/1977 | Coenen |
| 4,062,689 A | | 12/1977 | Suzuki et al. |
| 4,090,884 A | | 5/1978 | Goeman |
| 4,115,135 A | | 9/1978 | Goeman |
| 4,140,533 A | | 2/1979 | Ohtomo et al. |
| 4,345,037 A | | 8/1982 | Fyles et al. |
| 4,994,114 A | | 2/1991 | Thiery et al. |
| 5,755,876 A | * | 5/1998 | Stokes et al. ............... 106/739 |
| 5,803,960 A | | 9/1998 | Baxter |
| 5,837,315 A | * | 11/1998 | Foltz et al. .................. 427/136 |
| 5,985,011 A | * | 11/1999 | Foltz et al. ............... 106/14.05 |
| 6,022,408 A | * | 2/2000 | Stokes et al. ............... 106/739 |
| 6,344,081 B1 | * | 2/2002 | Pelot et al. .................. 106/711 |

FOREIGN PATENT DOCUMENTS

| | | |
|---|---|---|
| DE | 28 08 569 | 12/1978 |
| JP | 54-14428 | 2/1979 |
| JP | 55-3367 | 1/1980 |
| WO | WO 97/09282 | 3/1997 |
| WO | WO 98/31645 | 7/1998 |

OTHER PUBLICATIONS

Pike et al., "Binary silicate glasses in the study of a alkali aggregate reaction," *Highway Research Board Bulletin*, vol. 275, 1960, pp. 39–44 No month.

Beier et al; "Preparation of LI20–SI02 gels and glasses by Sol–Gel Methods," *Glastechnische Berichte, De, Verlag Der Deutschen Glastecnishchen Gesellschaft, Frankfurt*, vol. 63, No. 6, Jun. 1, 1990, pp. 163–171.

Zhang et al., "Micromechanism of formation of amorphous thin films of Li20–B203, Li20–Si02 and Li20–P205 by PVD," *Solid State Ionics*, vol. 18&19, 1986, pp. 741–746 No month.

Varshneya, "Fundamentals of inorganic glasses," *Academic Press*, 1993 No month.

West, "Phase equilibria in the system Li20– CaO–SiO2," *Journal of the American Ceramic Society*, vol. 61, No. 3–4, 1978, pp. 152–155 No month.

Kiyosumi et al., "Glass compositions for converging lenses," *Chemical Abstracts & Indexes, U.S. American Chemical Society, Columbus*, vol. 109, No. 4, Jul. 25, 1988.

W.J. McCoy et al., "New Approach to Inhibiting Alkali–Aggregate Expansion," *J. Am.Concrete Inst.*, vol. 22, pp. 693–706; May, 1951.

Stark et al., "Eliminating or Minimizing Alkali–Silica Reactivity," *Constructions Technology Laboratories, Inc.*, Sidney Diamond, Purdue University, Strategic Highway Research Program, Washington, DC, SHRP–C–343, pp. 75–106, 1993 No month.

Pattengill et al.; "Use of Ground Glass aas a Pozzolan," presented at the Albuquerque Symposiium on Utilization of Waste Glass in Secondary Products, Jan. 24–25, 1973; pp. 157–166.

Samtur; "Glass Recycling and Reuse," *IES Report*, 17, p. 69; Mar., 1974.

Batalin et al., "Use of Waste Sheet and Bottle Glass for Making Divitrified Glass Concrete," *Glass and Ceramics*, pp. 510–513, 1992 No month.

Xu et al., "Effectiveness of mineral Admixtures in Reducing ASR Expansion," *Cement and Concrete Research*, abstract, 1995 No month.

Reindl, "Recycling of Glass Cullet for Non–Container Uses," May 20, 1996.

\* cited by examiner

*Primary Examiner*—Karl Group
(74) *Attorney, Agent, or Firm*—Myers Bigel Sibley & Sajovec, PA

(57) ABSTRACT

Lithium glass capable of minimizing the effects of alkali silica reaction in concrete. The lithium glass includes a glass forming oxide; lithium oxide; and optionally a glass network modifying oxide. The lithium glass can be also essentially free of sodium or potassium ions.

179 Claims, No Drawings

CEMENTS INCLUDING LITHIUM GLASS COMPOSITIONS

FIELD OF THE INVENTION

This invention relates generally to compositions and processes for controlling alkali-silica reaction using the same, and more particularly to the use of lithium containing glass compositions as components of concrete.

BACKGROUND OF THE INVENTION

Concrete is a conglomerate of aggregate (such as gravel, sand, and/or crushed stone), water, and hydraulic cement (such as portland cement), as well as other components and/or additives. Concrete is generally fluidic when it is first made, enabling it to be poured or placed into shapes, and then later hardens, and is never again fluidic, in the general sense. Typically, moisture present in normal concrete is basic (that is, has a high pH). Alkali materials can be supplied by the cement, aggregate, additives, and even from the environment in which the hardened concrete exists (such as salts placed on concrete to melt ice).

Silica compounds are typically found in the aggregate components of concrete. Silica which is present in aggregates used to make concrete and mortars is subject to attack and dissolution by hydroxide ions present in basic solutions. Generally, the higher the pH (i.e., the more basic the solution), the faster the attack.

Different forms of silica show varying degrees of susceptibility to this dissolution. If there is sufficient alkali metal ion also present in this solution (such as sodium or potassium ions), the alkali metal ions can react with the dissolved silica and form an alkali-silica gel. Under certain conditions, the resultant alkali-silica gel can absorb water and swell. The swelling can exert pressures greater than the tensile strength of the concrete and thus cause the concrete to swell and crack. This process (hydroxide attack of silica, followed by reaction with alkali such as sodium and potassium) is referred to generally in the art as an "alkali-silica reaction" or "ASR".

ASR has caused the failure of concrete structures, although rarely. Further, ASR can weaken the ability of concrete to withstand other forms of attack. For example, concrete that is cracked due to this process can permit a greater degree of saturation and is therefore much more susceptible to damage as a result of "freeze-thaw" cycles. Similarly, cracks in the surfaces of steel reinforced concrete can compromise the ability of the concrete to keep out salts when subjected to de-icers, thus allowing corrosion of the steel it was designed to protect.

ASR is a common chemical process in many concretes around the world. As an indication of its importance to the concrete industry, by 1991 over 1,450 research articles had been published on the subject. See S. Diamond, *Alkali-aggregate reactions in concrete: an annotated bibliography*1939–1991, Washington, D.C.: National Research Council, Strategic Highway Research Program, SHRP-C/UWP-92-601:470 (1992).

In 1987, Congress authorized a $150 million, five-year research program to be administered by the National Research Council to study and develop improvements in highway construction materials and construction practices. This program was called the Strategic Highway Research Program (SHRP). One of the areas addressed by this program was ASR mitigation. Four recommendations resulted from the SHRP research for preventing ASR in concrete. D. Stark, et al., *Eliminating or minimizing alkali-silica reactivity*, Washington, D.C. National Research Council, Strategic Highway Research Program, SHRP-C-343 (1993) (the "SHRP report").

One recommendation was the use of a low alkali cement, which is defined as a cement with a sodium equivalent of 0.60% or less. The sodium equivalent of a cement is the weight percent of sodium, reported as sodium oxide, plus 0.658 times the weight percent of potassium, reported as potassium oxide. Sodium equivalent ($Na_2O_e$) can be represented generally by the formula $NaO_2+0.658 \times K_2O=Na_2O_e$.

While the use of a low alkali cement can have some effectiveness, it is not a guarantee of ASR prevention. Low alkali cement is not always available on a local basis, can have limited availability, and can be more expensive than high alkali cement. Further, if the raw feed for the cement production contains high levels of alkali, then the production of low alkali cement from such feed can generate much greater waste than would otherwise be the case. Generally, "fines" are a waste product of cement production and are normally recirculated into the cement kiln. However,when the raw feed has a high alkali level, the fines must be removed from the process and constitute a waste material. These fines are called cement kiln dust.

Still further, using a low alkali cement is no guarantee of ASR control, as the cement is not the sole source of the alkalies in concrete that can contribute to the problem. Alkalies also can be supplied by pozzolans that are either admixed in or part of the blended cement. Alkalies can be supplied by the mix water, admixtures used in the concrete, the aggregate itself, including recycled concrete used as aggregate, and/or deicers applied in snow and ice removal.

Another recommendation set forth by the SHRP report is the use of a non-reactive aggregate. This, however, is not always possible. There are limited aggregates with no potential for reactivity, since all silica has some potential for reaction and most aggregates contain significant amounts of silica. Recycled concrete when used as aggregate can also by reactive, particularly if it had already had ASR occurring before it was recycled. There are environmental reasons to use recycled glass as aggregate, but this is very reactive material. Also, transporting aggregates over long distances instead of using locally available materials adds significantly to the cost of concrete production.

Another recommendation is the use of appropriate levels of a suitable pozzolan. A pozzolan is a siliceous material that can combine with lime and water to harden, similar to a cement with just water. Since the hydration of cement produces lime as a byproduct (resulting in its basic nature), pozzolans can work well with cements. The pozzolan may be added as a mineral admixture at the time of concrete production, blended with the cement, or interground with the cement during the final production step of cement. The end result is about the same, as neither the cement nor the pozzolan is substantially changed as a result of the blending.

However, sources of suitable pozzolans are not always available locally, and the supplies are limited. Also, many pozzolans used for this purpose are waste products, and thus are quite variable in composition. An example is fly ash, which is the end result of coal burned for electric generation.

Further, sufficient amounts of the pozzolan must be used, or the protection is short lived, or the ASR can actually be made worse. This is particularly true of pozzolans with significant lime contents, such as many fly ashes. In a cementitious system, the Ca:Si ratio is very important to its stability with regard to ASR. The higher the Ca:Si ratio, the less capable the system is of tying up alkali present, and there is more susceptibility to ASR. A low lime content pozzolan will reduce the ratio and give more protection from increased alkalies. However, a high lime content pozzolan will not give this protection, and further, since pozzolans carry their own alkalies into the system, this can easily make the situation worse.

Still another recommendation is the use of a lithium-based admixture. Use of lithium was shown to be effective in ASR inhibition in 1951 (see W. J. McCoy and A. G. Caldwell, "New approach to inhibiting alkali-aggregate expansion," *J. Amer. Concrete Institute*, 22:693–706 (1951)). See also Y. Sakaguchi, et al., "The inhibiting effect of lithium compounds on alkali-silica reaction," *Proceedings, 8th international conference, alkali aggregate reaction*, Kyoto, Japan: 229–234 (1989), and the SHRP report.

For example, lithium salts, such as lithium hydroxide monohydrate, have been added to cement at the grinding stage of the cement production. J. Gajda, *Development of a cement to inhibit alkali-silica reactivity*, Skokie, Ill., Portland Cement Association Research and Development Bulletin RD115T (1996). As with the pozzolan blended cements mentioned above, the net effect is basically the same as if the lithium salt were admixed into the concrete separately at the time the concrete was batched. That is, by adding the lithium salt to the cement at the time of grinding, neither the cement nor the lithium salt is changed during the process. Rather, the lithium salt and cement are merely blended.

Despite the effectiveness of cement produced in this manner to mitigate ASR, using relatively pure lithium compounds can result in substantial amounts of the lithium (about 50%, as reported in the SHRP Report) being "locked up" in the hydration products of the early hydration reactions of the cement. A substantial portion of the lithium ions, therefore, is unavailable for use in controlling ASR. This generally happens within the first few days of hydration. Still further, the concentration of hydroxyl ion can increase when lithium salts are admixed into concrete and mortars (see the SHRP Report). This can make the job of the lithium ion that much more difficult, and requires more lithium than would otherwise be the case.

In addition, lithium salts, such as lithium carbonate, lithium nitrate, lithium hydroxide and lithium fluoride, can be expensive relative to other concrete additives.

SUMMARY OF THE INVENTION

The present invention provides novel glass compositions that can inhibit alkali-silica reactivity from alkali containing components in hardened cementitious structures. In the invention, lithium containing materials, including lithium salts and lithium ores, are heated with a glass forming material, such as silica, to form a melt. In addition, a glass network modifying agent can also be present, for example, to reduce melting temperature, to delay or aid crystallization, to change solubility, to change color, etc. The melt is then cooled to form a glass material, which includes lithium oxide as a component. Alternatively, soluble forms of the glass forming oxide, lithium oxide and optionally glass network modifying oxides are combined to form a gel and the gel dried to form the glass composition. The resultant lithium containing material supplies lithium ions to the glass. This in turn enables the glass to inhibit alkali-silica reaction in concrete and mortars which include the glass as a component.

The invention not only provides a glass material capable of reducing the undesired effects of ASR. The invention can also provide economies of manufacture and use. For example, less lithium is required to inhibit ASR than prior techniques in which purified forms of lithium are added directly to concrete (such as direct addition of LiOH). As discussed above, adding lithium salt directly to a concrete mixture can result in substantial amounts of the lithium being "locked up" in the hydration products of the cement. A substantial portion of the lithium ions, therefore, is unavailable for use in controlling ASR. In contrast, in the present invention, the lithium is added as part of an admixture so that the lithium ions are not locked up early during the hydration process and thus are available after much of cement hydration has occurred.

Further, the inventors have found that glass can be prepared using relatively high levels of lithium, contrary to teachings in the art that glass cannot be formed using high lithium concentrations. This in turn can provide benefits in use because relatively small dosages of a lithium "concentrate" (the lithium glass) can be added to concrete yet still be effective against ASR. Additional benefits have been observed by adding the lithium glass to concrete in combination with a pozzolanic material, which can further reduce the lithium dosage required to provide protection against ASR.

Still further, because the lithium glass can be prepared from the raw starting materials, the composition of the resultant glass can be readily tailored and adjusted according to the specific needs of the end user.

DETAILED DESCRIPTION OF THE INVENTION

The present invention now will be described more fully hereinafter, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The lithium glass compositions of the invention generally include one or more glass forming oxides and lithium oxide. The lithium glass compositions of the invention can also optionally include one or more glass network modifying oxides. As discussed below, such optional glass network modifying oxides can be added for various reasons, for example, to reduce melting temperature, to delay or aid crystallization, to change solubility, to change color, etc. Thus, the glass compositions may be binary glasses, i.e., include at least one glass forming oxide and lithium oxide. The glass compositions of the invention can also be ternary glasses, i.e., further include at least one glass modifying oxide. The skilled artisan will appreciate, however, that trace amounts of other components may be present in the compositions, for example, components brought in as impurities in the raw batch materials, through erosion of the refractories, and the like. Thus the present invention encompasses the presence of such impurities.

The lithium glass of the invention can include glass forming oxides of the general formula $RO_2$ in which R is an element capable of forming a glass forming oxide. R can be, without limitation, an element of Group IVA, Group IVB, the Lanthanide series and the Actinide series of the Periodic Table of Elements, such as Si, Ge, Sn, Zr, Ti, Ce, Th, and the like and mixtures thereof. It is noted, however, that the lithium glasses of the invention can provide protection against ASR without requiring the presence of zirconium oxide, and thus the invention contemplates glasses which are essentially free of $ZrO_2$. Stated differently, the lithium glass of the invention can provide protection against ASR without including zirconium in an amount sufficient to contribute to the ASR protection. The glass forming oxide may also include oxides of the formula $R^1{}_2O_5$, in which $R^1$ is also an element suitable for forming a glass forming oxide. $R^1$ can include without limitation an element from Group VA and VB of the Periodic Table of Elements, such as P, V, La and the like and mixtures thereof. Additional glass forming oxides include oxides of the formula $R^2{}_2O_3$, in which $R^2$ is also an element suitable for forming a glass forming oxide. $R^2$ can include without limitation an element from Group IIIA of the Periodic Table of Elements, such as B and the like and mixtures thereof.

The glass forming oxide is derived from any of the glass forming materials as known in the art. Glass forming materials can generally be described as any of the types of materials as known in the art which can be heated to fusion temperatures and then gradually cooled to an amorphous state with minimal or substantially no crystallization. Stated differently the resultant material is generally an amorphous, undercooled liquid of extremely high viscosity which has the appearance of a solid. Amorphous compositions are preferred, but the compositions can contain crystals.

The most common glass forming material is silica, which is particularly useful in the glass compositions of the invention. The invention is not limited to silica, however, and other glass forming materials as known in the art can also be used, either singly or in combination with one another and/or with silica.

The amount of glass forming material used (and the resultant amount of glass forming oxide present in the glass of the invention) can vary, depending upon several factors such as the type of glass former used, the types and amounts of other components, the process conditions used to make the glass, such as the temperature needed to fuse the raw ingredients into a glass, and the like. The amount required in a given formulation can be readily determined by the skilled artisan. Exemplary compositions include glass forming oxide in an amount of at least about 35 weight percent of the total weight of the glass composition, and advantageously from about 40 to about 80 weight percent, although amounts outside this range can also be used.

The glass compositions of the invention also include lithium oxide ($Li_2O$). The inventors have found that glass which incorporates lithium as a component can provide a level of protection against ASR in cementitious structures. In addition, however, the inventors have found that glass having relatively high levels of lithium oxide can be readily formed, despite conventional teaching that lithium oxide negatively impacts glass formation. In this regard, in contrast to the teachings in the art, the lithium glass of the invention can have greater than 5 percent by weight lithium oxide.

The lithium oxide source material may be any material capable of mixing with the molten glass forming materials upon heating and decomposing to form lithium oxide in the glass composition. Lithium containing materials useful in practicing the invention include, but are not limited to, organic and inorganic lithium salts, such as lithium nitrate, lithium sulphate, lithium citrate, lithium formate, lithium borate, lithium acetate, lithium meta- or tetraborate, lithium benzoate, lithium salts of simple carboxylic acids generally described by the formula RC(O)OH, wherein R is selected from the group consisting of alkyl, aryl, alkylaryl, arylalkyl, or cycloalkyl, and the like, lithium halides, such as lithium chloride, lithium bromide, lithium fluoride and the like, lithium hydroxide, lithium carbonate, lithium nitrite, lithium ortho- and metaphosphate, lithium aluminate, lithium meta- and polysilicates, and the like, and mixtures thereof.

Other lithium sources include lithium bearing ores and lithium ore concentrates such as lithium aluminum silicates, such as spodumene ($Li_2O \approx Al_2O_3 \approx 4SiO_2$), petalite ($Li_2O \approx Al_2O_3 \approx 8SiO_2$), eucryptite ($Li_2O \approx Al_2O_3 \approx 2SiO_2$), montrebrasite, lepidolite, lithium-aluminate phosphate ores, such as amblygonite ($LiF \approx AlPO_4$), lithium-bearing clays, and the like and mixtures thereof.

The glass compositions of the invention include lithium oxide in an amount sufficient to impart a level of protection against ASR in cementitious structures. The level of protection can be determined, for example, by measuring the percent expansion of a cementitous structure over a period of time using standard tests, such as ASTM C227, ASTM C1293, and the like. Generally the lithium glass of the invention will include sufficient lithium oxide so that when the glass is added to a cementitious structure, less expansion is observed than for the same structure without the lithium glass.

The amount of lithium source material used to make the lithium glass of the invention, as well as the resultant amount of lithium oxide present in the glass product, can also vary depending upon factors such as those noted above, including without limitation: the types and amounts of other components, process conditions, and the like. The glass of the invention can have from about 3 to about 40 weight percent lithium oxide, more preferably from about 8 to about 30 weight percent, based on the total weight of the glass composition, although the glass can include amounts outside this range as well, so long as the glass composition provides protection against ASR. In some aspects of the invention, the lithium glass can have as little as 0.5 weight percent lithium oxide and still provide the benefits described above.

The lithium glass compositions of the invention can also optionally include one or more one glass network modifying oxides. In this regard, as the skilled artisan will appreciate, glass network modifiers are materials added to the raw materials that are capable of providing oxides that stabilize the glass and make the glass substantially insoluble. Glass network modifiers can also be used to reduce melting temperatures, to delay or aid crystallization, to change solubility, to change color, and the like. In the present invention, glass modifying agents can be used for purposes other than that typically associated with such agents. For example, one such modifier is calcia. Calcia can provide improved performance (i.e., improved protection against ASR) in the glass compositions of the invention, and is not necessarily added for its solubility reducing properties. In this regard, the inventors have demonstrated improved performance against ASR by increasing the amount of CaO from 22 weight percent to 44 weight in 8 weight percent $LiO_2$ glass.

The glass network modifying oxides can be defined generally by the formula $R^3{}_2O_3$, in which $R^3$ can be any element capable of forming a glass network modifying oxide. $R^3$, without limitation, is generally an element selected from the group consisting of transition metals, Group IIIA elements, Group VA elements, such as B, Al, Fe, Cr, Bi, and the like and mixtures thereof.

The glass network modifying oxide can also have the formula $R^4O$, in which $R^4$ is also defined as an element capable of forming a glass network modifying oxide. $R^4$ without limitation can be an element selected from the group consisting of alkaline earth metals, such as Be, Mg, Ca, Ba and the like; transition metal elements, such as Sr, Zn, Ni, Cu, Cd, Mn, Co, Fe, and the like; and Group IVA elements such as Pb; as well as mixtures thereof. In the present invention, when the glass network modifying oxide is $R^4O$, and $R^4$ is an alkaline earth metal, then the glass can include greater than 0.5 mol percent $R^4O$.

Still other glass network modifying oxides can have the formula $R^5{}_2O$ in which $R^5$ can be any element capable of forming a glass network modifying oxide. $R^5$, without limitation, is generally a Group IA element (other than lithium). However, in contrast to conventional soda lime glass, which typically includes soda ($Na_2O$) to lower the melting temperature of the glass forming material such as silica, the lithium glass of the present invention advantageously is essentially free of sodium or potassium ions. The compositions may, however, contain small amounts of sodium where the sodium does not decrease the effectiveness of the glass (for example less than 5 weight percent sodium).

Such oxides can be derived using any of the glass network modifying materials as known in the art, including without limitation calcia, alumina, magnesia, and the like and mixtures thereof. It is noted that alumina, for example, can be supplied by clays or feldspars. The amount glass modifying source material and the resultant amount of oxide derived therefrom present in the compositions can vary, depending upon several factors such as noted above, including without limitation: the types and amounts of other components, process conditions, and the like. The lithium glass compositions of the invention generally include the glass forming oxide and lithium oxide in the weight percents discussed above, optionally with network modifying oxide making up the balance of the composition.

A particularly preferred lithium glass composition of the invention is a ternary glass composition that includes SiO2 as the glass forming oxide, preferably in an amount from about 40 to about 80 weight percent; CaO as the glass network modifying oxide, preferably in an amount from about 20 to about 50 weight percent; and $Li_2O$, preferably in an amount of at least about 0.5 weight percent, and more preferably from about 3 to about 30 weight percent. Another useful lithium glass composition of the invention is a ternary glass composition that includes $SiO_2$ as the glass forming oxide, preferably in an amount from about 40 to about 80 weight percent; $Al_2O_3$ as the glass network modifying oxide, preferably in an amount greater than about 5 weight percent; and $Li_2O$, preferably in an amount of at least about 0.5 weight percent, and more preferably from about 3 to about 40 weight percent.

Another advantageous glass composition of the invention is a binary system which include a glass forming oxide, such as $SiO_2$, $B_2O_3$, or $P_2O_5$. The binary glass systems can include at least about 0.5 weight percent lithium oxide, preferably from about 5 to about 25 weight percent lithium oxide, with the balance glass forming oxide.

The lithium glass compositions of the invention can be prepared as follows. The desired raw starting materials (including at least one glass forming material, at least one lithium containing material and optionally at least one glass network modifier, as described above) are heated to a temperature sufficient to form a molten mixture and to fuse the materials. The heating step can be a batch or continuous process and can employ any of the types of ovens known in the art for making glass materials. Heating conditions such as temperature and time can vary depending upon the amounts and types of components used. Generally the temperature ranges from about 400 to about 1300° C., although temperatures outside of this range may be used for a given composition. The composition is heated for a time sufficient to fuse the materials and to free the melt of undissolved materials. The resultant molten composition is then cooled, for example by pouring the molten composition onto a chilled steel plate or through chilled rollers. The rate of cooling also depending on factors such as the composition makeup, and is generally selected to be rapid enough to prevent phase separation. These process conditions can be readily determined by the skilled artisan.

Other processes can be used as well, such as a sol-gel process. In this case, the ingredients are soluble forms of the glass forming oxide, lithium oxide and optionally glass network modifying oxides (for example tetraethoxysilane, lithium hydroxide monohydrate, calcium hydroxide, etc.). Generally a sol-gel process includes combining the materials at room temperature to form a gel and then drying the gel.

After cooling the lithium glass can be treated to provide the desired size glass particles. For example, the cooled lithium glass can be initially crushed, for example in a steel mortar or other suitable device as known in the art.

The inventors have found that addition of the lithium glass of the invention to cementitious structures can provide protection against ASR. The lithium glass of the invention can be admixed with cement and/or pozzolanic materials, which in turn can be added to concrete, mortar and the like. Alternatively, the lithium glass can be directly added to concrete, mortar, etc, to provide the benefit of protection against, ASR in the hardened cementitious structure.

The lithium glass is used in an amount effective to provide protection against the detrimental effects of ASR, particularly compared to the same cementitious composition without lithium. The amount of lithium glass added to the cementitious mixture will depend on various factors, such as the alkali content of the cement, the amount of lithia present in the glass, and the like. Generally the lithium glass can be substituted for cement according to the total alkali content (calculated as $Na_2O_e=Na_2O+0.658\times K_2O$) of the cement in a ratio of about 0.74 to about 1 on a Li:Na atomic ratio, although more can be used, albeit with reduced economies of scale.

In one aspect of this embodiment of the invention, pozzolanic materials can also be added to the concrete in addition to the lithium glass. If pozzolans are used in combination with the lithium glass of the invention, the amount of lithium glass used can be reduced without substantial loss of effectiveness. For example, when using pozzolans in combination with the lithium glass, the dose of lithium glass can be reduced to as low as about 40 percent of the original dose without fly ash. This can provide additional economies of use.

In addition to the lithium containing glass compositions of the invention, the concrete compositions of the invention generally include cement, aggregate (in addition to the lithium glass of the invention), water, optionally ASTM C494 defined chemical admixtures such as water reducing, accelerating, retarding admixtures, and other chemical admixtures understood to act as corrosion inhibitors in conventional amounts. As used herein, the term "cement" refers to, but is not limited to, hydraulic and alite cements, such as Portland cement; blended cements, such as Portland cement blended with fly ash, blast-furnace slag, pozzolans, and the like, and mixtures thereof; masonry cement; oil well cement; natural cement; alumina cement; expansive cements, and the like, and mixtures thereof. Portland cements include cements such as described in ASTM C150 Type I and IA, Type II and IIA, Type III and IIIA, Type IV, and Type V. The term also includes cements blended with ASTM C311 defined pozzolanic materials such as fly ash, raw and calcined natural pozzolans, ASTM C989 defined ground granulated blast furnace slag, ASTM C1240 defined silica fume materials, metakaolin, and the like. The cement is present in the fluid concrete mixture in an amount between about 5% to about 20% by weight based on the total weight of the concrete mixture.

Aggregates can include, but are not limited to natural and crushed quarried aggregate, sand, recycled concrete aggregate, glass, and the like, as well as mixtures thereof. Aggregate is present in the fluid concrete mixture in an amount between about 75% to about 95% by weight, based on the total weight of the concrete mixture.

The fluid concrete mixture also includes water, in an amount ranging from about 2% to about 10% by weight based on the total weight of the mixture.

The fluid concrete mixture also can include other materials as known in the art for imparting various properties to concrete, including, but not limited to, air-entraining admixtures, water reducing admixtures, accelerating admixtures, pozzolans (as noted above, such as, but not limited to, fly ash, metakaolin, and silica fume), and the like. These agents can be present in conventional amounts.

Although reference has been made to the components of concrete, it will be appreciated that the present invention also includes mortar compositions, which generally are similar in composition to concrete, except that mortar is typically made with sand as the sole aggregate, in contrast to concrete which includes larger aggregates. Sand in this sense is aggregate of about ⅜" and smaller in diameter.

The present invention will be further illustrated by the following non-limiting examples.

EXAMPLE 1

Lithium glass in accordance with one aspect of the invention was prepared by mixing and heating various components to form a melt and thereafter chilling the resultant melt to form a lithium glass. The table below sets forth the glass oxide composition as well as the type and amounts of raw materials used to make the glass. As indicated in the table, this glass composition is referred to as a "B" glass.

| | Glass Composition | | | Raw Materials | | |
|---|---|---|---|---|---|---|
| % oxide | $Li_2O$ | $SiO_2$ | CaO | Silica | $Li_2CO_3$ | Whiting |
| "B" glass | 8 | 47.8 | 44.16 | 32.67 | 13.53 | 53.8 |

The B glass was then evaluated to determine the protection provided against ASR. In this regard, the B glass was added to a cementitious mixture, in one sample with 20% fly ash and in another without fly ash. Expansion of the structure over time was measured. A control sample of the same cementitious mixture but without lithium glass was also evaluated for expansion utilizing the same test. The results are set forth below in the following table.

lithium glass of the invention admixed therein as compared to the same cementitious structure without the lithium glass.

EXAMPLE 2

Additional lithium glass formulations were also evaluated for protection against expansion of cementitious structures due to ASR. The table below sets for the oxide compositions of the glasses and the type and amount of raw material used to make the glass. These glasses were also prepared by heating the components and cooling the melt to form a glass.

| | Glass Composition | | | | Raw Materials | | |
|---|---|---|---|---|---|---|---|
| % oxide | $Al_2O_3$ | CaO | $SiO_2$ | $Li_2O$ | Silica | $Li_2CO_3$ | Whit-ing | Georgia Kaolin |
| $Al_2O_3$ glass | 12 | | 62 | 25 | 33.82 | 43.38 | | 22.8 |
| CaO glass | | 29 | 51 | 20 | 53.02 | 15.16 | 31.81 | |
| "B" glass | | 44 | 48 | 8 | 32.67 | 13.53 | 53.8 | |

The lithium glasses were then evaluated to determine the protection provided against ASR by adding the lithium glass to a cementitious mixture and measuring expansion of the same over time in accordance with ASTM C227. Using this test, expansion of less than 0.1% is considered passing. A control sample of the same cementitious mixture without lithium glass but with 20% fly ash was also evaluated for

TABLE 1

| | % Expansion | | | | | | | | | | | | |
|---|---|---|---|---|---|---|---|---|---|---|---|---|---|
| Days | 14 | 28 | 42 | 56 | 70 | 84 | 98 | 112 | 126 | 140 | 168 | 210 | 287 |
| B Glass | 0.005% | 0.007% | 0.006% | 0.005% | 0.011% | 0.006% | 0.006% | 0.010% | 0.009% | 0.011% | 0.012% | 0.014% | 0.014% |
| B Glass + 20% fly ash | 0.002% | 0.005% | 0.003% | 0.000% | 0.007% | 0.003% | 0.002% | 0.007% | 0.005% | 0.006% | 0.010% | 0.012% | 0.012% |
| Control | 0.010% | 0.026% | 0.030% | 0.033% | 0.044% | 0.043% | 0.045% | 0.051% | 0.053% | 0.055% | 0.061% | 0.065% | 0.072% |

This data illustrates the improved protection against expansion exhibited by the cementitious structures having the expansion utilizing the same test. The results are set forth below in the following table.

TABLE 2

| | % Expansion | | | | | | | | | | | |
|---|---|---|---|---|---|---|---|---|---|---|---|---|
| Days | 14 | 28 | 42 | 56 | 70 | 84 | 98 | 112 | 168 | 198 | 224 | 280 |
| 20% Fly Ash | 0.047% | 0.068% | 0.074% | 0.083% | 0.091% | 0.105% | 0.118% | 0.130% | 0.151% | 0.164% | 0.179% | 0.186% |
| $Al_2O_3$ glass | 0.009% | 0.011% | 0.009% | 0.012% | 0.012% | 0.013% | 0.018% | 0.018% | 0.016% | 0.019% | 0.022% | 0.023% |
| CaO glass | 0.006% | 0.007% | 0.007% | 0.009% | 0.007% | 0.009% | 0.015% | 0.016% | 0.012% | 0.016% | 0.018% | 0.021% |
| B glass[1] | 0.008% | 0.010% | 0.006% | 0.009% | 0.007% | 0.010% | 0.017% | 0.018% | 0.016% | 0.022% | 0.027% | 0.030% |
| $Al_2O_3$ glass[1] | 0.012% | 0.012% | 0.008% | 0.013% | 0.011% | 0.015% | 0.020% | 0.022% | 0.020% | 0.025% | 0.030% | 0.033% |
| CaO glass[1] | 0.007% | 0.007% | 0.005% | 0.008% | 0.008% | 0.010% | 0.016% | 0.018% | 0.018% | 0.023% | 0.029% | 0.032% |

[1]Sample also includes 20% fly ash.

This data also illustrates that the glasses of the inventions can provide added protection against the effects of ASR in cementitious structures.

EXAMPLE 3

Lithium glass in accordance with one aspect of the invention was prepared by mixing and heating various components to form a melt and thereafter chilling the resultant melt to form a lithium glass. The table below sets forth the glass oxide composition as well as the type and amounts of raw materials used to make the glass.

| | Glass Composition | | | | Raw Materials | | |
|---|---|---|---|---|---|---|---|
| % oxide | $Li_2O$ | $SiO_2$ | $Na_2O$ | CaO | Silica | $Li_2CO_3$ | $Na_2CO_3$ | whiting |
| A | 8 | 77.97 | 14.02 | — | 64.08 | 16.23 | 19.69 | — |
| B | 8 | 77.97 | 12.50 | 1.50 | 64.02 | 16.22 | 17.56 | 2.20 |
| C | 8 | 77.96 | 11.01 | 3.00 | 63.97 | 16.20 | 15.44 | 4.39 |
| D | 8 | 77.96 | 9.51 | 4.50 | 63.91 | 16.19 | 13.33 | 6.57 |
| E | 8 | 68.84 | — | 23.17 | 53.02 | 15.16 | — | 31.81 |
| F | 8 | 68.83 | 6.22 | 16.95 | 53.20 | 15.22 | 8.22 | 23.35 |
| G | 8 | 68.84 | 12.44 | 10.73 | 53.39 | 15.28 | 16.49 | 14.84 |
| H | 8 | 57.8 | — | 34.17 | 41.72 | 14.3 | — | 43.98 |

These samples were also evaluated for protection against ASR using ASTM 227, and the results are set forth below. In addition to the glass samples above, a sample without any additive (control) and with 15% fly ash were also evaluated.

TABLE 3

| | % Expansion | | | | | | | | |
|---|---|---|---|---|---|---|---|---|---|
| Days | 14 | 28 | 42 | 56 | 70 | 84 | 174 | 268 | 294 | 350 |
| A | 0.025% | 0.040% | 0.043% | 0.047% | 0.048% | N/A | 0.068% | N/A | 0.076% | 0.118% |
| B | 0.018% | 0.030% | 0.032% | 0.035% | 0.038% | N/A | 0.054% | N/A | 0.061% | 0.063% |
| C | 0.018% | 0.030% | 0.033% | 0.037% | 0.040% | N/A | 0.058% | N/A | 0.065% | 0.068% |
| D | 0.018% | 0.027% | 0.028% | 0.032% | 0.035% | N/A | 0.047% | N/A | 0.053% | 0.055% |
| E | 0.020% | 0.030% | 0.028% | 0.033% | 0.034% | N/A | 0.041% | N/A | 0.046% | 0.047% |
| F | 0.012% | 0.020% | 0.019% | 0.022% | 0.023% | N/A | 0.033% | N/A | 0.037% | 0.038% |
| G | 0.021% | 0.035% | 0.037% | 0.042% | 0.045% | N/A | 0.062% | N/A | 0.070% | 0.073% |
| 15 % Fly Ash | 0.041% | 0.069% | 0.083% | 0.097% | 0.107% | 0.127% | 0.215% | 0.245% | 0.256% | 0.262% |
| H | 0.006% | 0.011% | 0.011% | 0.013% | 0.012% | 0.013% | 0.019% | 0.019% | 0.022% | 0.024% |
| Control | 0.097% | 0.165% | 0.213% | 0.247% | 0.270% | 0.292% | 0.362% | 0.376% | 0.383% | 0.386% |

This data also illustrates that the glasses of the inventions can provide added protection against the effects of ASR in cementitious structures.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A cementitious structure stabilized against alkali-silica reactivity (ASR) from alkali containing components, comprising:
   hydrated cement;
   lithium glass which is essentially free of sodium ions, said lithium glass comprising at least one glass forming oxide; and lithium oxide;
   optionally aggregate; and
   optionally at least one pozzolan.

2. The cementitious structure of claim 1, wherein said at least one glass forming oxide comprises one or more glass forming oxides of the formula $RO_2$, wherein R is an element selected from the group consisting of Group IVA, Group IVB, the Lanthanide Series, the Actinide Series, and mixtures thereof.

3. The cementitious structure of claim 2, wherein R is selected from the group consisting of Si, Ge, Sn, Ti, Ce, Th and mixtures thereof.

4. The cementitious structure of claim 1, wherein said at least one glass forming oxide comprises one or more glass forming oxides of the formula $R^1_2O_5$, wherein $R^1$ is an element selected from the group consisting of Group VA, Group VB, and mixtures thereof.

5. The cementitious structure of claim 4, wherein $R^1$ is selected from the group consisting of P, V, Ta, and mixtures thereof.

6. The cementitious structure of claim 1, wherein said at least one glass forming oxide comprises one or more glass forming oxides of the formula $R^2_2O_3$, in which $R^2$ is an element from Group IIIA of the Periodic Table of Elements.

7. The cementitious structure of claim 6, wherein $R^2$ is B.

8. The cementitious structure of claim 1, wherein said at least one glass forming oxide comprises $SiO_2$.

9. The cementitious structure of claim 1, wherein said lithium glass comprises at least about 35 weight % of said at least one glass forming oxide.

10. The cementitious structure of claim 9, wherein said lithium glass comprises about 40 to about 80 weight % of said at least one glass forming oxide.

11. The cementitious structure of claim 1, wherein said lithium glass comprises about 3 to about 40 weight % lithium oxide.

12. The cementitious structure of claim 11, wherein said lithium glass comprises about 8 to about 30 weight % lithium oxide.

13. The cementitious structure of claim 1, wherein said at least one pozzolan is present and is selected from the group consisting of fly ash, raw and calcined natural pozzolans, ASTM C989 defined ground granulated blast furnace slag, ASTM C1240 defined silica fume materials, metakaolin, and mixtures thereof.

14. The cementitious structure of claim 1, wherein said lithium glass further comprises at least one glass network modifying oxide.

15. The cementitious structure of claim 14, wherein said at least one glass network modifying oxide comprises one or more glass network modifying oxides of the formula $R^3_2O_3$, wherein $R^3$ is an element selected from the group consisting of transition metals, Group IIIA, Group VA, and mixtures thereof.

16. The cementitious structure of claim 15, wherein $R^3$ is selected from the group consisting of B, Al, Fe, Cr, Bi, and mixtures thereof.

17. The cementitious structure of claim 14, wherein said at least one glass network modifying oxide comprises one or more glass network modifying oxides of the formula $R^4O$, wherein $R^4$ is an element selected from the group consisting of alkaline earth metals, transition metals, Group IVA, and mixtures thereof.

18. The cementitious structure of claim 17, wherein $R^4$ is selected from the group consisting of Be, Mg, Ca, Sr, Zn, Ni, Cu, Cd, Mn, Co, Fe, Pb and mixtures thereof.

19. The cementitious structure of claim 14, wherein said at least one network modifying oxide comprises CaO.

20. The cementitious structure of claim 19, wherein said lithium glass comprises at least about 20 weight % CaO.

21. The cementitious structure of claim 19, wherein said lithium glass comprises at least about 40 weight % CaO.

22. The cementitious structure of claim 14, wherein said lithium glass consists essentially of:
   $SiO_2$
   CaO; and
   $Li_2O$.

23. The cementitious structure of claim 14, wherein said lithium glass comprises:
   about 40 to about 80 weight % $SiO_2$;
   about 20 to about 50 weight % CaO; and
   about 8 to about 30 weight % $Li_2O$.

24. The cementitious structure of claim 14, wherein said lithium glass comprises:
   about 40 to about 80 weight % $SiO_2$;
   about 20 to about 50 weight % CaO; and
   at least about 0.5 weight % $Li_2O$.

25. The cementitious structure of claim 14, wherein said lithium glass consists essentially of:
   $SiO_2$
   $Al_2O_3$; and
   $Li_2O$.

26. The cementitious structure of claim 14, wherein said lithium glass comprises:
   about 40 to about 80 weight % $SiO_2$;
   greater than about 5 weight % $Al_2O_3$; and
   about 8 to about 30 weight % $Li_2O$.

27. The cementitious structure of claim 14, wherein said lithium glass comprises:
   about 40 to about 80 weight % $SiO_2$;
   greater than about 5 weight % $Al_2O_3$; and
   at least about 0.5 weight % $Li_2O$.

28. The cementitious structure of claim 1, wherein said lithium glass consists essentially of:
   $SiO_2$, $B_2O_3$, or $P_2O_5$; and
   $Li_2O$.

29. The cementitious structure of claim 1, wherein said lithium glass comprises:
   $SiO_2$, $B_2O_3$, or $P_2O_5$; and
   about 5 to about 25 weight % $Li_2O$.

30. The cementitious structure of claim 1, wherein said lithium glass is essentially free of sodium ions and potassium ions.

31. The cementitious structure of claim 1, wherein said aggregate and said at least one pozzolan are present.

32. Cement capable of stabilizing a cementitious structure against alkali-silica reactivity (ASR) from alkali containing components, comprising:
   cement;
   lithium glass which is essentially free of sodium ions, said lithium glass comprising at least one glass forming oxide; and lithium oxide.

33. The cement of claim 32, wherein said cement is Portland cement.

34. The cement of claim 32, wherein said at least one glass forming oxide comprises one or more glass forming oxides of the formula $RO_2$, wherein R is an element selected from the group consisting of Group IVA, Group IVB, the Lanthanide Series, the Actinide Series, and mixtures thereof.

35. The cement of claim 34, wherein R is selected from the group consisting of Si, Ge, Sn, Ti, Ce, Th and mixtures thereof.

36. The cement of claim 32, wherein said at least one glass forming oxide comprises one or more glass forming oxides of the formula $R^1_2O_5$, wherein $R^1$ is an element selected from the group consisting of Group VA, Group VB, and mixtures thereof.

37. The cement of claim 36, wherein $R^1$ is selected from the group consisting of P, V, Ta, and mixtures thereof.

38. The cement of claim 32, wherein said at least one glass forming oxide comprises one or more glass forming oxides of the formula $R^2_2O_3$, in which $R^2$ an element from Group IIIA of the Periodic Table of Elements.

39. The cement of claim 38, wherein $R^2$ is B.

40. The cement of claim 32, wherein said at least one glass forming oxide comprises $SiO_2$.

41. The cement of claim 32, wherein said lithium glass comprises at least about 35 weight % of said at least one glass forming oxide.

42. The cement of claim 32, wherein said lithium glass comprises about 40 to about 80 weight % of said at least one glass forming oxide.

43. The cement of claim 32, wherein said lithium glass comprises about 3 to about 40 weight % lithium oxide.

44. The cement of claim 32, wherein said lithium glass comprises about 8 to about 30 weight % lithium oxide.

45. The cement of claim 32, wherein the lithium glass further comprises at least one glass network modifying oxide.

46. The cement of claim 45, wherein said at least one glass network modifying oxide comprises one or more glass network modifying oxides of the formula $R^3_2O_3$, wherein $R^3$ is an element selected from the group consisting of transition metals, Group IIIA, Group VA, and mixtures thereof.

47. The cement of claim 46, wherein R is selected from the group consisting of B, Al, Fe, Cr, Bi, and mixtures thereof.

48. The cement of claim 45, wherein said at least one glass network modifying oxide comprises one or more glass network modifying oxides of the formula $R^4O$, wherein $R^4$ is an element selected from the group consisting of alkaline earth metals, transition metals, Group IVA, and mixtures thereof.

49. The cement of claim 48, wherein $R^4$ is selected from the group consisting of Be, Mg, Ca, Sr, Zn, Ni, Cu, Cd, Mn, Co, Fe, Pb and mixtures thereof.

50. The cement of claim 45, wherein said at least one network modifying oxide comprises CaO.

51. The cement of claim 50, wherein said lithium glass comprises at least about 20 weight % CaO.

52. The cement of claim 50, wherein said lithium glass comprises at least about 40 weight % CaO.

53. The cement of claim 45, wherein said at least one glass forming oxide is $SiO_2$ and said at least one glass network modifying oxide is CaO.

54. The cement of claim 53, wherein said lithium glass comprises:
   about 40 to about 80 weight % $SiO_2$;
   about 20 to about 50 weight % CaO.

55. The cement of claim 45, wherein said lithium glass consists essentially of:
SiO$_2$
CaO; and
Li$_2$O.

56. The cement of claim 45, wherein said lithium glass comprises:
about 40 to about 80 weight % SiO$_2$;
about 20 to about 50 weight % CaO; and
about 8 to about 30 weight % Li$_2$O.

57. The cement of claim 45, wherein said lithium glass comprises at least about 0.5 weight % Li$_2$O.

58. The cement of claim 45, wherein said lithium glass consists essentially of:
SiO$_2$
Al$_2$O$_3$; and
Li$_2$O.

59. The cement of claim 45, wherein said lithium glass comprises:
about 40 to about 80 weight % SiO$_2$;
greater than about 5 weight % Al$_2$O$_3$; and
about 8 to about 30 weight % Li$_2$O.

60. The cement of claim 45, wherein said lithium glass comprises:
about 40 to about 80 weight % SiO$_2$;
greater than about 5 weight % Al$_2$O$_3$; and
at least about 0.5 weight % Li$_2$O.

61. The cement of claim 32, wherein said lithium glass consists essentially of:
SiO$_2$, B$_2$O$_3$, or P$_2$O$_5$; and
Li$_2$O.

62. The cement of claim 32, wherein said lithium glass comprises:
SiO$_2$, B$_2$O$_3$, or P$_2$O$_5$; and
about 5 to about 25 weight % Li$_2$O.

63. The cement of claim 32, wherein said lithium glass comprises:
SiO$_2$, B$_2$O$_3$, or P$_2$O$_5$; and
at least about 0.5 weight % Li$_2$O.

64. The cement of claim 32, wherein said lithium glass is essentially free of sodium ions and potassium ions.

65. The cement of claim 32, further comprising at least one pozzolan.

66. The cement of claim 65, wherein said at least one pozzolan is present and is selected from the group consisting of fly ash, raw and calcined natural pozzolans, ASTM C989 defined ground granulated blast furnace slag, ASTM C 1240 defined silica fume materials, metakaolin, and mixtures thereof.

67. A process for making cement capable of stabilizing a cementitious structure against alkali-silica reactivity (ASR) from alkali containing components, the process comprising mixing cement with a lithium glass which is essentially free of sodium ions and comprises at least one glass forming oxide; and lithium oxide, said lithium glass present in an amount sufficient to minimize ASR in a cementitious structure.

68. The process of claim 67, wherein said at least one glass forming oxide comprises one or more glass forming oxides of the formula RO$_2$, wherein R is an element selected from the group consisting of Group IVA, Group IVB, the Lanthanide Series, the Actinide Series, and mixtures thereof.

69. The process of claim 68, wherein R is selected from the group consisting of Si, Ge, Sn, Ti, Ce, Th and mixtures thereof.

70. The process of claim 67, wherein said at least one glass forming oxide comprises one or more glass forming oxides of the formula R$^1_2$O$_5$, wherein R$^1$ is an element selected from the group consisting of Group VA, Group VB, and mixtures thereof.

71. The process of claim 70, wherein R$^1$ is selected from the group consisting of P, V, Ta, and mixtures thereof.

72. The process of claim 67, wherein said at least one glass forming oxide comprises one or more glass forming oxides of the formula R$^2_2$O$_3$, in which R$^2$ an element from Group IIIA of the Periodic Table of Elements.

73. The process of claim 72, wherein R$^2$ is B.

74. The process of claim 67, wherein said at least one glass forming oxide comprises SiO$_2$.

75. The process of claim 67, wherein said lithium glass comprises at least about 35 weight % of said at least one glass forming oxide.

76. The process of claim 75, wherein said lithium glass comprises about 40 to about 80 weight % of said at least one glass forming oxide.

77. The process of claim 67, wherein said lithium glass comprises about 3 to about 40 weight % lithium oxide.

78. The process of claim 67, wherein the lithium glass further comprises at least one glass network modifying oxide.

79. The process of claim 78, wherein said at least one glass network modifying oxide comprises one or more glass network modifying oxides of the formula R$^3_2$O$_3$, wherein R$^3$ is an element selected from the group consisting of transition metals, Group IIIA, Group VA, and mixtures thereof.

80. The process of claim 79, wherein R is selected from the group consisting of B, Al, Fe, Cr, Bi, and mixtures thereof.

81. The process of claim 78, wherein said at least one glass network modifying oxide comprises one or more glass network modifying oxides of the formula R$^4$O, wherein R$^4$ is an element selected from the group consisting of alkaline earth metals, transition metals, Group IVA, and mixtures thereof.

82. The process of claim 81, wherein R$^4$ is selected from the group consisting of Be, Mg, Ca, Sr, Zn, Ni, Cu, Cd, Mn, Co, Fe, Pb and mixtures thereof.

83. The process of claim 78, wherein said at least one network modifying oxide comprises CaO.

84. The process of claim 83, wherein said lithium glass comprises at least about 20 weight % CaO.

85. The process of claim 78, wherein said lithium glass consists essentially of:
SiO$_2$
CaO; and
Li$_2$O.

86. The process of claim 78, wherein said lithium glass comprises:
about 40 to about 80 weight % SiO$_2$;
about 20 to about 50 weight % CaO; and
about 8 to about 30 weight % Li$_2$O.

87. The process of claim 78, wherein said lithium glass comprises:
about 40 to about 80 weight % SiO$_2$;
about 20 to about 50 weight % CaO; and
at least about 0.5 weight % Li$_2$O.

88. The process of claim 78, wherein said lithium glass consists essentially of:
SiO$_2$
Al$_2$O$_3$; and
Li$_2$O.

89. The process of claim 78, wherein said lithium glass comprises:

about 40 to about 80 weight % $SiO_2$;
greater than about 5 weight % $Al_2O_3$; and
about 8 to about 30 weight % $Li_2O$.

90. The process of claim 78, wherein said lithium glass comprises:
about 40 to about 80 weight % $SiO_2$;
greater than about 5 weight % $Al_2O_3$; and
at least about 0.5 weight % $Li_2O$.

91. The process of claim 67, wherein said lithium glass consists essentially of:
$SiO_2$, $B_2O_3$, or $P_2O_5$; and
$Li_2O$.

92. The process of claim 67, wherein said lithium glass comprises:
$SiO_2$, $B_2O_3$, or $P_2O_5$; and
about 5 to about 25 weight % $Li_2O$.

93. The process of claim 67, wherein said lithium glass comprises:
$SiO_2$, $B_2O_3$, or $P_2O_5$; and
at least about 0.5 weight % $Li_2O$.

94. The process of claim 67, wherein said cement is Portland cement.

95. The process of claim 67, wherein said cement comprises at least one pozzolan.

96. The process of claim 95, wherein said at least one pozzolan is selected from the group consisting of fly ash, raw and calcined natural pozzolans, ASTM C989 defined ground granulated blast furnace slag, ASTM C 1240 defined silica fume materials, metakaolin, and mixtures thereof.

97. A process for making a cementitious structure stabilized against alkali-silica reactivity (ASR) from alkali containing components, the process comprising mixing cement, aggregate, water, and a lithium glass which is essentially free of sodium ions and comprises at least one glass forming oxide; and lithium oxide, said lithium glass present in an amount sufficient to minimize ASR in a cementitious structure.

98. The process of claim 97, wherein said at least one glass forming oxide comprises one or more glass forming oxides of the formula $RO_2$, wherein R is an element selected from the group consisting of Group IVA, Group IVB, the Lanthanide Series, the Actinide Series, and mixtures thereof.

99. The process of claim 98, wherein R is selected from the group consisting of Si, Ge, Sn, Ti, Ce, Th and mixtures thereof.

100. The process of claim 99, wherein said at least one glass forming oxide comprises one or more glass forming oxides of the formula $R^1_2O_5$, wherein $R^1$ is an element selected from the group consisting of Group VA, Group VB, and mixtures thereof.

101. The process of claim 100, wherein $R^1$ is selected from the group consisting of P, V, Ta, and mixtures thereof.

102. The process of claim 97, wherein said at least one glass forming oxide comprises one or more glass forming oxides of the formula $R^2_2O_3$, in which $R^2$ an element from Group IIIA of the Periodic Table of Elements.

103. The process of claim 102, wherein $R^2$ is B.

104. The process of claim 97, wherein said at least one glass forming oxide comprises $SiO_2$.

105. The process of claim 97, wherein said lithium glass comprises at least about 35 weight % of said at least one glass forming oxide.

106. The process of claim 97, wherein said lithium glass comprises about 40 to about 80 weight % of said at least one glass forming oxide.

107. The process of claim 97, wherein said lithium glass comprises about 3 to about 40 weight % lithium oxide.

108. The process of claim 97, wherein said lithium glass comprises about 8 to about 30 weight % lithium oxide.

109. The process of claim 97, wherein the lithium glass further comprises at least one glass network modifying oxide.

110. The process of claim 109, wherein said at least one glass network modifying oxide comprises one or more glass network modifying oxides of the formula $R^3_2O_3$, wherein $R^3$ is an element selected from the group consisting of transition metals, Group IIIA, Group VA, and mixtures thereof.

111. The process of claim 110, wherein R is selected from the group consisting of B, Al, Fe, Cr, Bi, and mixtures thereof.

112. The process of claim 109, wherein said at least one glass network modifying oxide comprises one or more glass network modifying oxides of the formula $R^4O$, wherein $R^4$ is an element selected from the group consisting of alkaline earth metals, transition metals, Group IVA, and mixtures thereof.

113. The process of claim 112, wherein $R^4$ is selected from the group consisting of Be, Mg, Ca, Sr, Zn, Ni, Cu, Cd Mn, Co, Fe, Pb and mixtures thereof.

114. The process of claim 109, wherein said at least one network modifying oxide comprises CaO.

115. The process of claim 114, wherein said lithium glass comprises at least about 20 weight % CaO.

116. The process of claim 109, wherein said lithium glass consists essentially of:
$SiO_2$
CaO; and
$Li_2O$.

117. The process of claim 109, wherein said lithium glass comprises:
about 40 to about 80 weight % $SiO_2$;
about 20 to about 50 weight % CaO; and
about 8 to about 30 weight % $Li_2O$.

118. The process of claim 109, wherein said lithium glass comprises:
about 40 to about 80 weight % $SiO_2$;
about 20 to about 50 weight % CaO; and
at least about 0.5 weight % $Li_2O$.

119. The process of claim 109, wherein said lithium glass consists essentially of:
$SiO_2$
$Al_2O_3$; and
$Li_2O$.

120. The process of claim 109, wherein said lithium glass comprises:
about 40 to about 80 weight % $SiO_2$;
greater than about 5 weight % $Al_2O_3$; and
about 8 to about 30 weight % $Li_2O$.

121. The process of claim 109, wherein said lithium glass comprises:
about 40 to about 80 weight % $SiO_2$;
greater than about 5 weight % $Al_2O_3$; and
at least about 0.5 weight % $Li_2O$.

122. The process of claim 97, wherein said lithium glass consists essentially of:
$SiO_2$, $B_2O_3$, or $P_2O_5$; and
$Li_2O$.

123. The process of claim 97, wherein said lithium glass comprises:
$SiO_2$, $B_2O_3$, or $P_2O_5$; and
about 5 to about 25 weight % $Li_2O$.

124. The process of claim 97, wherein said lithium glass comprises:
$SiO_2$, $B_2O_3$, or $P_2O_5$; and at least about 0.5 weight % $Li_2O$.

125. The process of claim 97, wherein said cement is Portland cement.

126. The process of claim 97, wherein said cement comprises at least one pozzolan.

127. The process of claim 126, wherein said at least one pozzolan is selected from the group consisting of fly ash, raw and calcined natural pozzolans, ASTM C989 defined ground granulated blast furnace slag, ASTM C1240 defined silica fume materials, metakaolin, and mixtures thereof.

128. The process of claim 97, said process comprising mixing cement, aggregate, water, a pozzolan, and the lithium glass.

129. The process of claim 128, wherein said pozzolan is selected from the group consisting of fly ash, raw and calcined natural pozzolans, ASTM C989 defined ground granulated blast furnace slag, ASTM C1240 defined silica fume materials, metakaolin, and mixtures thereof.

130. A fluid cement mixture for providing a cementitious structure stabilized against alkali-silica reactivity (ASR) from alkali containing components, comprising:
cement;
water;
lithium glass which is essentially free of sodium ions, said lithium glass comprising at least one glass forming oxide; and lithium oxide;
optionally aggregate; and
optionally at least one pozzolan.

131. The mixture of claim 130, wherein said at least one glass forming oxide comprises one or more glass forming oxides of the formula $RO_2$, wherein R is an element selected from the group consisting of Group IVA, Group IVB, the Lanthanide Series, the Actinide Series, and mixtures thereof.

132. The mixture of claim 131, wherein R is selected from the group consisting of Si, Ge, Sn, Ti, Ce, Th and mixtures thereof.

133. The mixture of claim 130, wherein said at least one glass forming oxide comprises one or more glass forming oxides of the formula $R^1_2O_5$, wherein $R^1$ is an element selected from the group consisting of Group VA, Group VB, and mixtures thereof.

134. The mixture of claim 133, wherein $R^1$ is selected from the group consisting of P, V, Ta, and mixtures thereof.

135. The mixture of claim 132, wherein said at least one glass forming oxide comprises one or more glass forming oxides of the formula $R^2_2O_3$, in which $R^2$ an element from Group IIIA of the Periodic Table of Elements.

136. The mixture of claim 135, wherein $R^2$ is B.

137. The mixture of claim 130, wherein said at least one glass forming oxide comprises $SiO_2$.

138. The mixture of claim 130, wherein said lithium glass comprises at least about 35 weight % of said at least one glass forming oxide.

139. The mixture of claim 130, wherein said lithium glass comprises about 40 to about 80 weight % of said at least one glass forming oxide.

140. The mixture of claim 130, wherein said lithium glass comprises about 3 to about 40 weight % lithium oxide.

141. The mixture of claim 130, wherein said lithium glass comprises about 8 to about 30 weight % lithium oxide.

142. The mixture of claim 130, wherein the lithium glass further comprises at least one glass network modifying oxide.

143. The mixture of claim 142, wherein said at least one glass network modifying oxide comprises one or more glass network modifying oxides of the formula $R^3_2O_3$, wherein $R^3$ is an element selected from the group consisting of transition metals, Group IIIA, Group VA, and mixtures thereof.

144. The mixture of claim 143, wherein R is selected from the group consisting of B, Al, Fe, Cr, Bi, and mixtures thereof.

145. The mixture of claim 142, wherein said at least one glass network modifying oxide comprises one or more glass network modifying oxides of the formula $R^4O$, wherein $R^4$ is an element selected from the group consisting of alkaline earth metals, transition metals, Group IVA, and mixtures thereof.

146. The mixture of claim 145, wherein $R^4$ is selected from the group consisting of Be, Mg, Ca, Sr, Zn, Ni, Cu. Cd, Mn, Co, Fe, Pb and mixtures thereof.

147. The mixture of claim 142, wherein said at least one network modifying oxide comprises CaO.

148. The mixture of claim 147, wherein said lithium glass comprises at least about 20 weight % CaO.

149. The mixture of claim 147, wherein said lithium glass comprises at least about 40 weight % CaO.

150. The mixture of claim 142, wherein said lithium glass consists essentially of:
$SiO_2$
CaO; and
$Li_2O$.

151. The mixture of claim 142, wherein said lithium glass comprises:
about 40 to about 80 weight % $SiO_2$;
about 20 to about 50 weight % CaO; and
about 8 to about 30 weight % $Li_2O$.

152. The mixture of claim 142, wherein said lithium glass comprises:
about 40 to about 80 weight % $SiO_2$;
about 20 to about 50 weight % CaO; and
at least about 0.5 weight % $Li_2O$.

153. The mixture of claim 142, wherein said lithium glass consists essentially of:
$SiO_2$
$Al_2O_3$; and
$Li_2O$.

154. The mixture of claim 142, wherein said lithium glass comprises:
about 40 to about 80 weight % $SiO_2$;
greater than about 5 weight % $Al_2O_3$; and
about 8 to about 30 weight % $Li_2O$.

155. The mixture of claim 142, wherein said lithium glass comprises:
about 40 to about 80 weight % $SiO_2$;
greater than about 5 weight % $Al_2O_3$; and
at least about 0.5 weight % $Li_2O$.

156. The mixture of claim 130, wherein said lithium glass consists essentially of:
$SiO_2$, $B_2O_3$, or $P_2O_5$; and
$Li_2O$.

157. The mixture of claim 130, wherein said lithium glass comprises:
$SiO_2$, $B_2O_3$, or $P_2O_5$; and
about 5 to about 25 weight % $Li_2O$.

158. The mixture of claim 130, wherein said lithium glass comprises:
$SiO_2$, $B_2O_3$, or $P_2O_5$; and
at least about 0.5 weight % $Li_2O$.

159. The mixture of claim 130, wherein the lithium glass is essentially free of sodium ions and potassium ions.

160. The mixture of claim 131, wherein said at least one pozzolan is present and is selected from the group consisting of fly ash, raw and calcined natural pozzolans, ASTM C989 defined ground granulated blast furnace slag, ASTM C1240 defined silica fume materials, metakaolin, and mixtures thereof.

161. The mixture of claim 131, wherein said aggregate is present in an amount between about 75% and 95% by weight, based on the total weight of the mixture.

162. A cementitious structure stabilized against alkali-silica reactivity (ASR) from alkali containing components, comprising:
hydrated cement;
lithium glass which is essentially free of sodium or potassium ions, said lithium glass comprising at least one glass forming oxide that comprises one or more glass forming oxides of the formula $R^1{}_2O_5$, wherein $R^1$ is an element selected from the group consisting of Group VA, Group VB, and mixtures thereof; lithium oxide; and at least one glass network modifying oxide;
optionally aggregate; and
optionally at least one pozzolan.

163. The cementitious structure of claim 162, wherein $R^1$ is selected from the group consisting of P, V, Ta, and mixtures thereof.

164. A cementitious structure stabilized against alkali-silica reactivity (ASR) from alkali containing components, comprising:
hydrated cement;
lithium glass which is essentially free of sodium or potassium ions, said lithium glass comprising at least one glass forming oxide that comprises one or more glass forming oxides of the formula $R^2{}_2O_3$, in which $R^2$ is an element from Group IIIA of the Periodic Table of Elements; and lithium oxide; and at least one glass network modifying oxide;
optionally aggregate; and
optionally at least one pozzolan.

165. The cementitious structure of claim 164, wherein $R^2$ is B.

166. A cementitious structure stabilized against alkali-silica reactivity (ASR) from alkali containing components, comprising:
hydrated cement;
lithium glass which is essentially free of sodium or potassium ions, said lithium glass comprising at least one glass forming oxide; lithium oxide; and at least one glass network modifying oxide, wherein said lithium glass comprises about 3 to about 40 weight % lithium oxide;
optionally aggregate; and
optionally at least one pozzolan.

167. The cementitious structure of claim 166, wherein said lithium glass comprises about 8 to about 30 weight % lithium oxide.

168. Cement capable of stabilizing a cementitious structure against alkali-silica reactivity (ASR) from alkali containing components, comprising:
cement; and
lithium glass which is essentially free of sodium or potassium ions, said lithium glass comprising at least one glass forming oxide that comprises one or more glass forming oxides of the formula $R^1{}_2O_5$, wherein $R^1$ is an element selected from the group consisting of Group VA, Group VB, and mixtures thereof; lithium oxide; and at least one glass network modifying oxide.

169. The cement of claim 168, wherein $R^1$ is selected from the group consisting of P, V, Ta, and mixtures thereof.

170. Cement capable of stabilizing a cementitious structure against alkali-silica reactivity (ASR) from alkali containing components, comprising:
cement; and
lithium glass which is essentially free of sodium or potassium ions, said lithium glass comprising at least one glass forming oxide that comprises one or more glass forming oxides of the formula $R^2{}_2O_3$, in which $R^2$ is an element from Group IIIA of the Periodic Table of Elements; and lithium oxide; and at least one glass network modifying oxide.

171. The cement of claim 170, wherein $R^2$ is B.

172. Cement capable of stabilizing a cementitious structure against alkali-silica reactivity (ASR) from alkali containing components, comprising:
cement; and
lithium glass which is essentially free of sodium or potassium ions, said lithium glass comprising at least one glass forming oxide; lithium oxide; and at least one glass network modifying oxide, wherein said lithium glass comprises about 3 to about 40 weight % lithium oxide.

173. The cement of claim 172, wherein said lithium glass comprises about 8 to about 30 weight % lithium oxide.

174. A fluid cement mixture for providing a cementitious structure stabilized against alkali-silica reactivity (ASR) from alkali containing components, comprising:
cement;
water;
lithium glass which is essentially free of sodium or potassium ions, said lithium glass comprising at least one glass forming oxide that comprises one or more glass forming oxides of the formula $R^1{}_2O_5$, wherein $R^1$ is an element selected from the group consisting of Group VA, Group VB, and mixtures thereof; lithium oxide; and at least one glass network modifying oxide;
optionally aggregate; and
optionally at least one pozzolan.

175. The mixture of claim 174, wherein $R^1$ is selected from the group consisting of P, V, Ta, and mixtures thereof.

176. A fluid cement mixture for providing a cementitious structure stabilized against alkali-silica reactivity (ASR) from alkali containing components, comprising:
cement;
water;
lithium glass which is essentially free of sodium or potassium ions, said lithium glass comprising at least one glass forming oxide that comprises one or more glass forming oxides of the formula $R^2{}_2O_3$, in which $R^2$ is an element from Group IIIA of the Periodic Table of Elements; and lithium oxide; and at least one glass network modifying oxide;
optionally aggregate; and
optionally at least one pozzolan.

177. The mixture of claim 176, wherein $R^2$ is B.

178. A fluid cement mixture for providing a cementitious structure stabilized against alkali-silica reactivity (ASR) from alkali containing components, comprising:
cement;
water;
lithium glass which is essentially free of sodium or potassium ions, said lithium glass comprising at least one glass forming oxide; lithium oxide; and at least one glass network modifying oxide, wherein said lithium glass comprises about 3 to about 40 weight % lithium oxide;
optionally aggregate; and
optionally at least one pozzolan.

179. The mixture of claim 178, wherein said lithium glass comprises about 8 to about 30 weight % lithium oxide.

* * * * *